Feb. 23, 1932. J. E. MALIVERT 1,847,014
LOCKING DEVICE
Filed Oct. 7, 1929   3 Sheets-Sheet 2
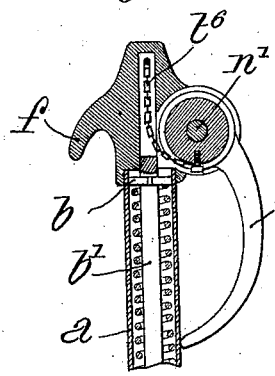
Fig.10
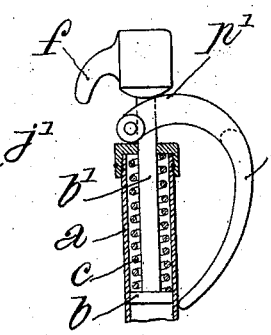
Fig.11
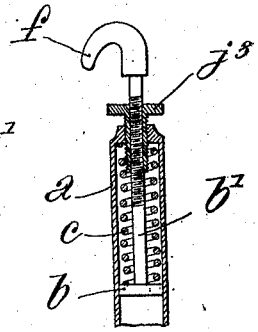
Fig.12
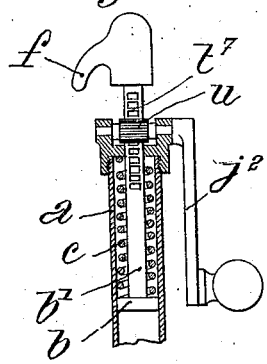
Fig.13
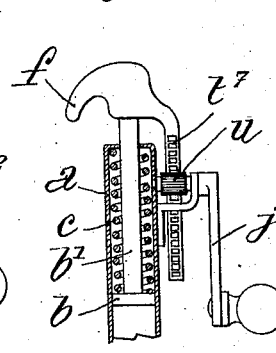
Fig.14
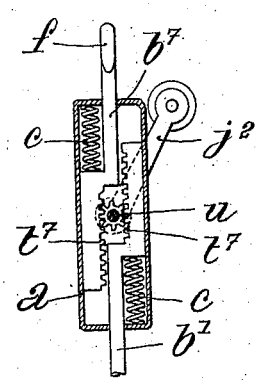
Fig.15
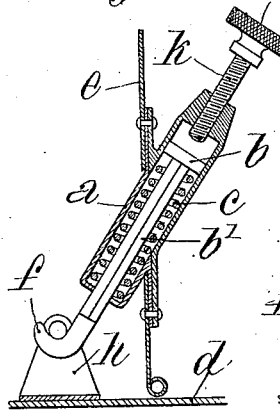
Fig.16
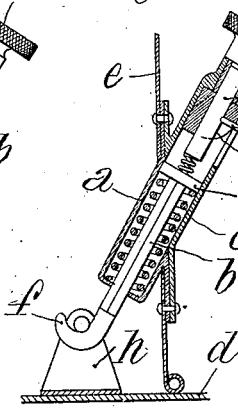
Fig.17
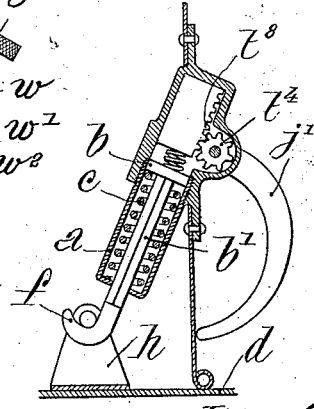
Fig.18
Inventor:
J. E. Malivert,
Att'y.

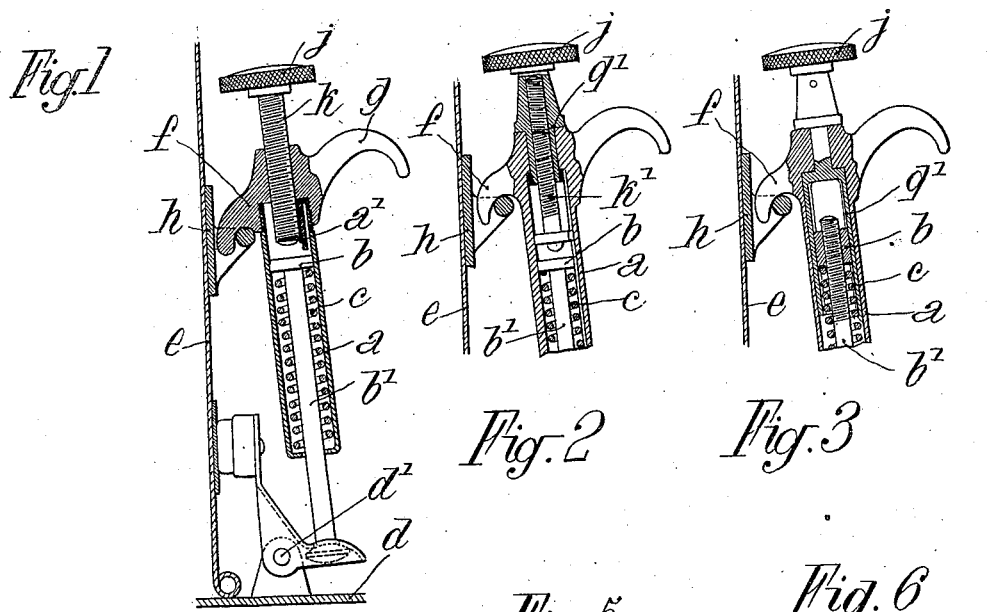
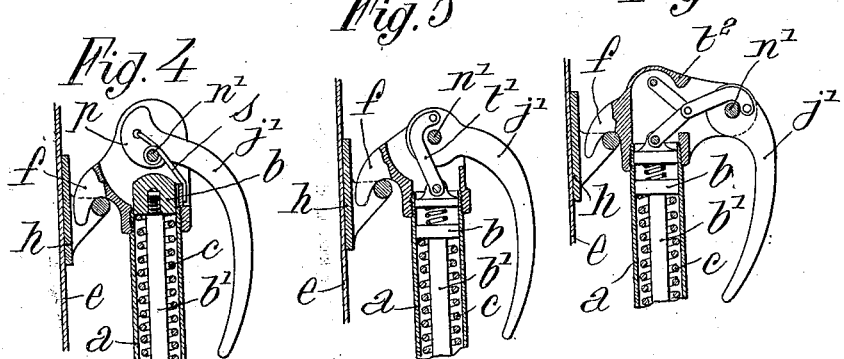
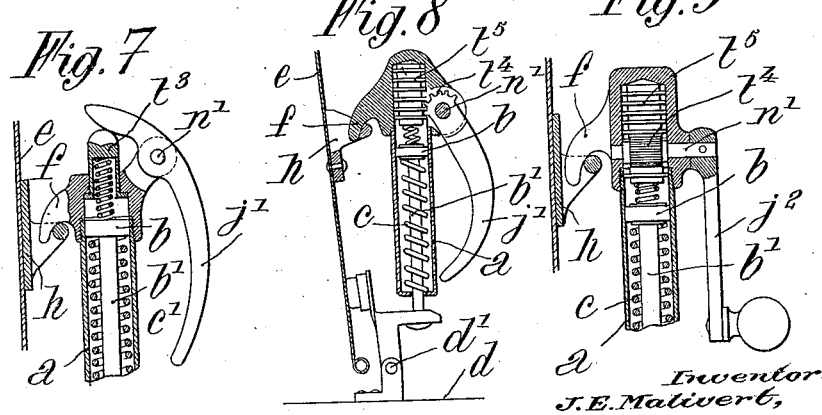

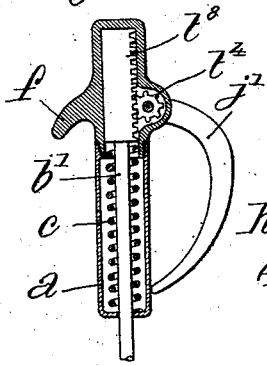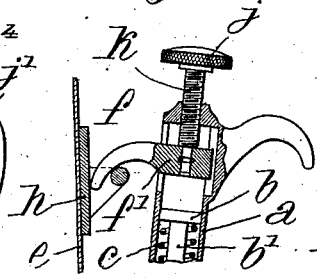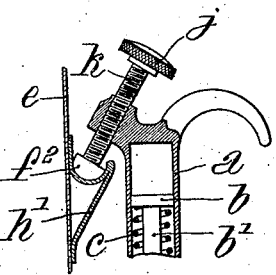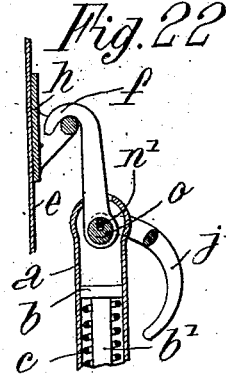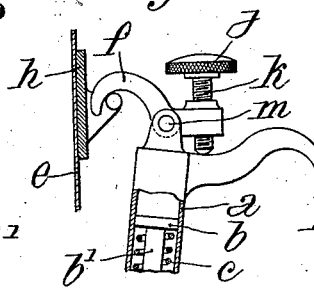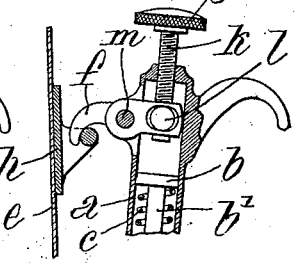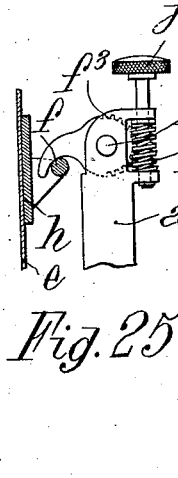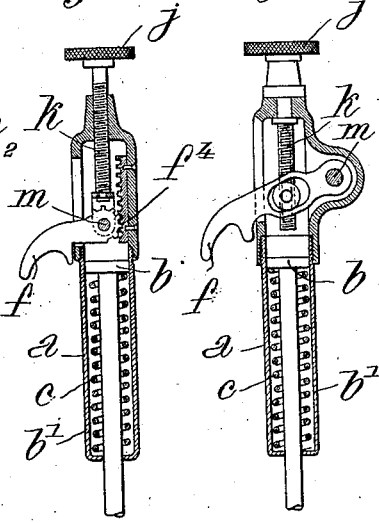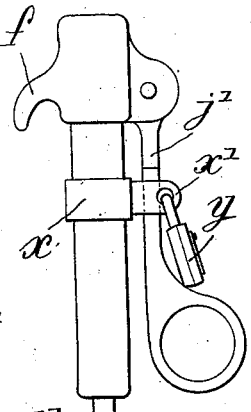

Patented Feb. 23, 1932

1,847,014

UNITED STATES PATENT OFFICE

JULES EUGÈNE MALIVERT, OF PARIS, FRANCE, ASSIGNOR TO "SOCIÉTÉ DITE: L'ACCESSOIRE DE PRECISION," OF LEVALLOIS-PERRET, FRANCE

LOCKING DEVICE

Application filed October 7, 1929, Serial No. 397,976, and in Luxemburg November 15, 1928.

The present invention relates to locking devices and, more especially, to those of the type adapted to be used for locking and releasing the hood of an automobile.

One of the objects of the invention is to provide means operative to facilitate opening and closing of the locking device for the hood.

Other objects will appear in the course of the detailed description now to be given with reference to the accompanying drawings, in which:—

Fig. 1 is an elevation, partially in section, of one illustrative embodiment of the invention;

Fig. 2 represents, in a similar manner, a second possible form of the invention;

Fig. 3 illustrates, in partial section, a third modification; and

Figs. 4 to 28 show, in elevation, and in partial section, twenty-five other possible variants.

Referring to Fig. 1 of the drawings, there is shown a hood $e$ designed to be locked to, and released from, frame element $d$ by an assembly composed of a cylindrical member $a$,—a stop $b$ slidably mounted in cylinder $a$ and integral with a rod $b^1$ which articulates with a lever $d^1$ pivotally mounted on chassis $d$, spring $c$ tending to force element $b$ upward,—a hook $f$ adapted to engage in a loop $h$ rigidly attached to hood $e$ and provided with a finger-piece $g$,—and a threaded element $k$ adapted to be rotated by milled head $j$ and provided with a braking element $a^1$.

Normally spring $c$ is calibrated to be sufficiently stiff to prevent dislodgment of element $f$ by vibrations transmitted thereto during movement of the automobile, but this stiffness is generally so great as to demand considerable effort on the part of the motorist when it is desired to open the hood by direct traction on finger-piece $g$. As will be at once apparent from inspection of the drawings, this effort is eliminated by turning screw $k$ so as to lower stop $b$ and compress spring $c$, hook $f$ being then easily disengageable from loop $h$. When it is desired to bring elements $f$ and $h$ back into tight engagement, it is only necessary to carry out an inverse series of operations.

The structures shown in Figs. 2 and 3 are slight variants of the one hereinabove described. In the form of device represented in Fig. 2, assembly $j$, $k$, $a^1$ is replaced by a threaded bolt $k^1$ adapted to exert pressure on head $b$, and a threaded female element $q^1$ adapted to be rotated by milled head $j$, the general operation being the same as for the assembly shown in Fig. 1. In the structure illustrated in Fig. 3, rod $b^1$ is in threaded engagement with stop $b$ and the latter is slidably mounted in longitudinal slots formed in female element $q^1$ which latter is rotatable by milled-head $j$. Here, again the general mode of operation is the same as for the structure shown in Fig. 1.

Referring now to Figs. 4 to 10, there is shown a series of general assemblies similar to those already described, but in which the rotation of a milled-head ($j$) is replaced by the angular displacement of a lever $j^1$ to counteract the action of spring $c$. In the structure shown in Fig. 4, lever $j^1$ is provided at one end with a cam-shaped portion $p$ and tends to move into its inactive position under the action of spring $s$ wound around pivot $n^1$. When lever $j^1$ is raised, head $b$ descends and compresses spring $c$. In the device shown in Fig. 5, cam $p$ (Fig. 4) is replaced by link $t^1$ connected to a resiliently mounted piston, in Fig. 6, by an articulated system $t^2$ whose operation is obvious, in Fig. 7 by a resiliently mounted button $t^3$, in Figs. 8 and 9, by rack and pinion assemblies $t^4$, $t^5$, and in Fig. 10, by a chain or cable $t^6$ winding on a drum integral with lever $j^1$. It will be noted that in the structure shown in Fig. 9, lever $j^1$ is replaced by a crank $j^2$. This arrangement permits hook $f$ to be entirely disengaged from loop $h$ by movement in a direction parallel to hood $e$, the multiplication of effort of crank $j^2$ being sufficiently great to do away with the necessity for movement transversely to $e$.

In the form of devices shown in Figs. 11 to 19, hook $f$ is directly connected to rod $b^1$ and the action of spring $c$ is modulated by the action of a lever $j^1$ provided with a cam portion $p^1$ bearing on a shoulder formed on the body portion of $f$ (Fig. 11), or by the rotation of a threaded element $j^3$ engaging interiorly with rod $b^1$ and exteriorly with cylinder $a$ (Fig. 12), or by the rotation of a crank $j^2$ driving a pinion $u$ which engages with toothed recesses $t^7$ formed in rod $b^1$ (Fig. 13), or by a system similar to Fig. 13 in which teeth $t^7$ are formed on a separate exterior element (Fig. 14), or by the action of a crank $j^2$ driving pinion $u$ on a pair of resiliently supported racks $t^7$, $t^7$ (Fig. 15), or by the action of an assembly $j$, $k$ similar to Fig. 1, loop $h$ being supported on chassis $d$ (Fig. 16), or by a rack and pinion assembly $t^4$, $t^8$ (Fig. 18), rack $t^8$ being made integral with rod $b^1$ (Fig. 19) is desired.

Figs. 19 to 27 show various devices for modifying the effect of spring $c$ by displacement of hook $f$. In Fig. 19, this is accomplished by means of lever $j^1$ reacting on rack and pinion $t^4$, $t^8$, in Fig. 20, by the action of screw $k$ on body $f^1$ of hook $f$, in Fig. 21, by displacement of nose $f^2$ fitting into support $h^1$, in Fig. 23, by the action of assembly $k$, $j$ on hook $f$ pivoted at $m$, in Fig. 25, by the action of worm and wheel $k^2$, $f^3$ on hook $f$ pivoted at $m$, in Fig. 26, by the action of screw $k$ on a rack and pinion $f^4$, $f$ being pivoted at $m$.

The structure shown in Fig. 28 shows how those forms of devices provided with a lever $j^1$ may be locked in position by means of lock $y$ traversing a pair of openings $x^1$ in a U-shaped element $x$ embracing cylinder $a$.

What I claim is:—

1. In combination, a pair of members movable relatively to one another, locking means pivotally attached to one of said members including a tube, a spring and a hook, said spring tending to move said hook in a direction parallel to the axis of said tube, a loop attached to the other of said pair of members and adapted to engage with said hook, and means operative to modify the effect exercised by said spring on said hook when spring and hook are in engagement with one another, said last-named means including a rack associated with said hook, a lever, and pinion means associated with said lever and meshing with said rack.

2. A structure as defined in claim 1 in combination with a second spring operative to move one end of said lever toward said tube.

3. A hood fastener, comprising locking means including a tube, a spring and a hook, said spring tending to move said hook in a direction parallel to the axis of said tube, a loop adapted to engage with said hook, and means operative to modify the effect exercised by said spring on said hook when spring and hook are in engagement with one another, said last-named means including a rack, a pinion, and means for rotating said pinion in contact with said rack.

JULES EUGÉNE MALIVERT.